April 4, 1967
A. L. THOMPSON
3,312,417
FISHING REEL
Filed June 18, 1962
3 Sheets-Sheet 2
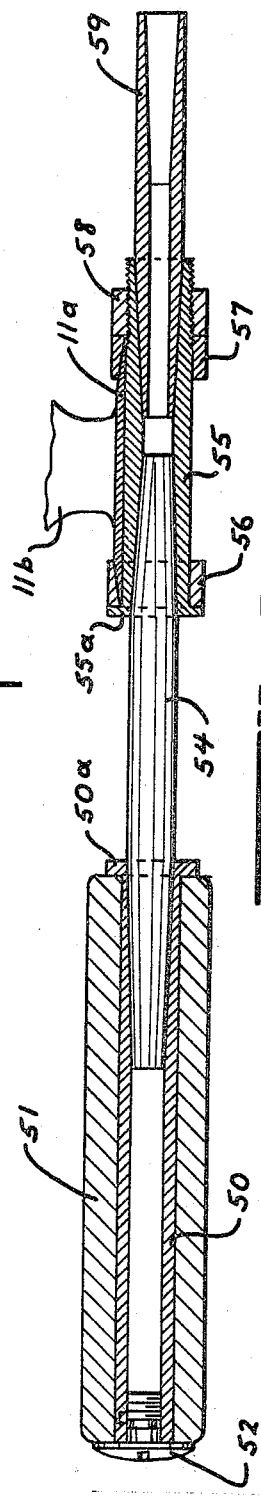
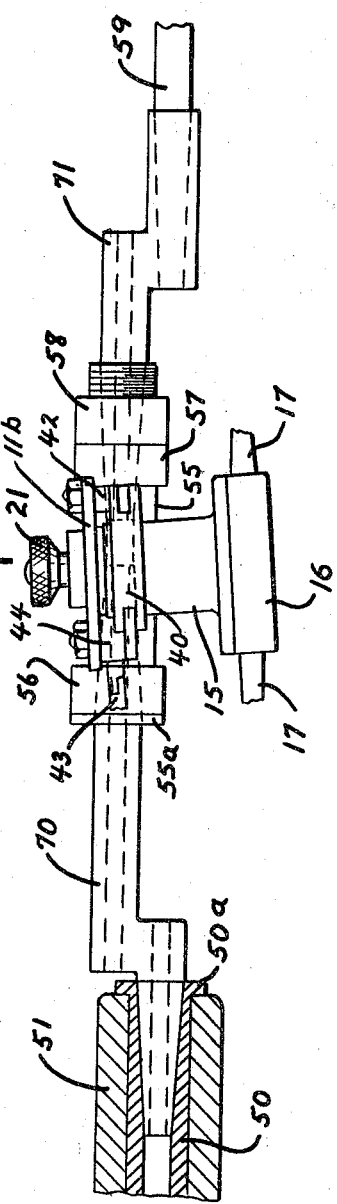
INVENTOR.
ADELBERT L. THOMPSON.
BY
Lockwood, Galt, Woodard & Smith.
ATTORNEYS.

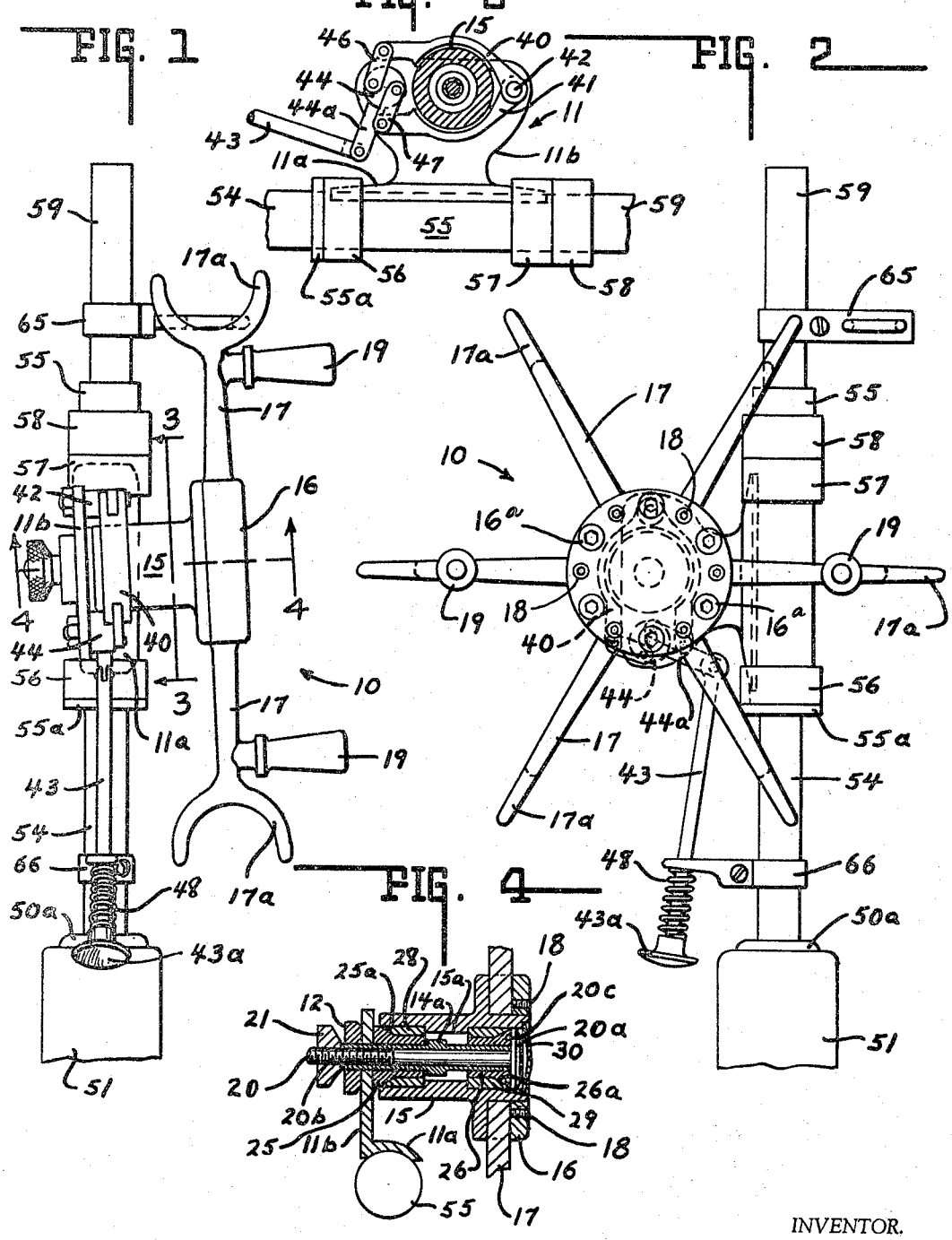

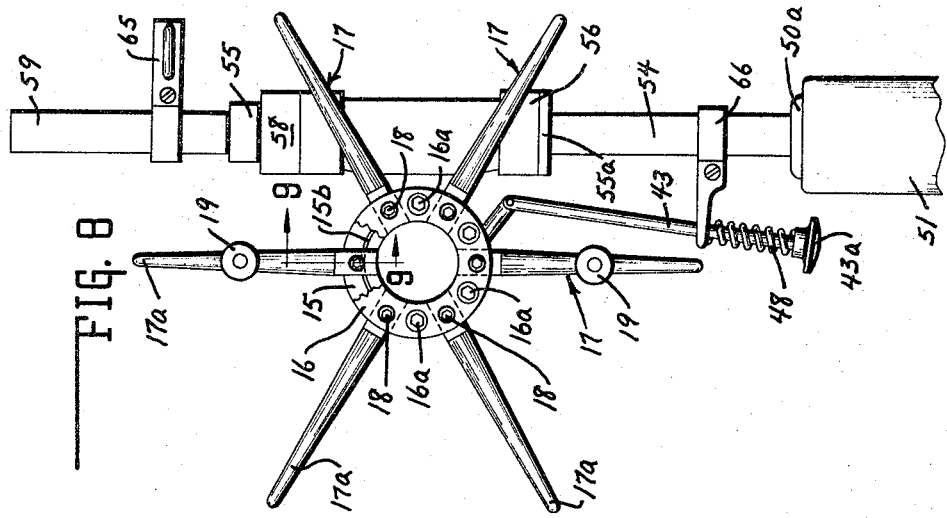
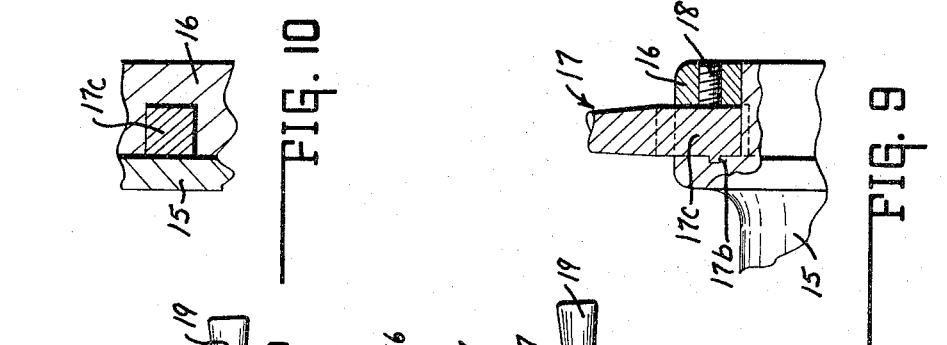
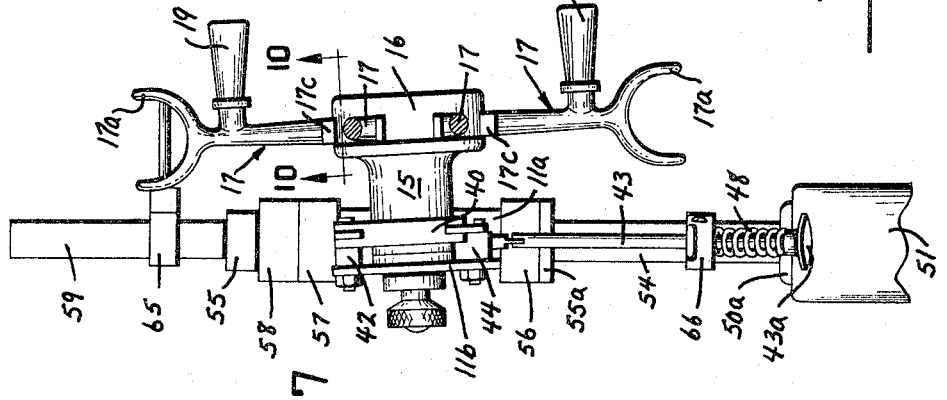
INVENTOR.
ADELBERT L. THOMPSON
BY
Varen D. Hochbert
Attorney

3,312,417
FISHING REEL
Adelbert L. Thompson, 2217 Bellemeade Ave., Evansville, Ind. 47714
Filed June 18, 1962, Ser. No. 205,172
1 Claim. (Cl. 242—84.1)

The present invention relates to fishing tackle and more particularly to a new and improved casting reel and handle structure which provides ease of operation as well as effective control and a high degree of balance, the instant application being a continuation-in-part of patent application Ser. No. 758,304, filed Sept. 2, 1958, for Casting Reel and Handle Structure, now abandoned.

As is well known, the prior types of casting reel and handle structure were oftentime difficult to use and presented a problem for customizing the control thereof to the likes and habits of each particular fisherman. Oftentimes, the use of these prior casting reel and handle structures presented difficulties in balance which, as is well known, is an important factor for perfecting a high degree of accuracy and skill in the art of casting.

By virtue of the instant invention, the applicant has provided a novel casting reel and handle structure which permits effective control for casting through a readily adjustable and personalized type of reel mounted on an effectively balanced handle for the most exacting fishing and the most critical fisherman.

The applicant's casting reel and handle structure comprises a reel mounted at a slight angle with reference to the longitudinal axis of the fishing rod, and having a novel reel tensioning device associated therewith. The applicant's reel has novel removable non-rotatable line-bearing forks radially disposed thereon which are readily replaceable if damaged. The reel is effectively positioned on the handle structure which is easily assembled with a minimum of components to afford an excellent weight and balance advantage, together with the added factor of interchangeability of substitute components. A novel brake assembly, which coacts with the hub of the reel, is effectively operable with one hand, permitting the use of the other hand for operating the reel or for netting a fish, for example.

A principal object of the present invention, therefore, is the provision of a casting reel and handle structure which provides for effective personalized control during the use thereof.

A more general object of the present invention is the provision of a casting reel and handle structure which may be readily assembled for use and which is arranged to provide the desired balance necessary for effective casting.

A further object of the present invention is the provision of a casting reel and handle structure which is light in weight and which may be readily manufactured.

A still further object of the present invention is the provision of radial non-rotatable removable line-bearing members for the hub of a casting reel, where such line-bearing members permit the orderly storage and throw of the line during use.

Other objects and a better understanding of the invention will become more apparent from the following detailed description, taken in conjunction with the accompanying drawings, in which FIG. 1 is a plan view, partially fragmentary, of the novel casting reel and handle structure forming the instant invention;

FIG. 2 is a view in side elevation, partially fragmentary, of the casting reel and handle structure of FIG. 1;

FIG. 3 is a view partially in side elevation and partially in vertical section, taken at line 3—3 of FIG. 1 and looking in the direction of the arrows, showing details of the braking mechanism assembly formed in accordance with the instant invention;

FIG. 4 is a partially fragmentary view in vertical section, taken at line 4—4 of FIG. 1 and looking in the direction of the arrows, showing the tension adjustment assembly forming a part of the applicant's novel casting reel and handle structure;

FIG. 5 is a view in vertical section showing a typical arrangement of components forming the casting handle;

FIG. 6 is a fragmentary plan view, generally corresponding to the view of FIG. 1, showing another embodiment of the invention whereby the reel is mounted in an offset position with reference to the longitudinal axis of the fishing rod;

FIG. 7 is a plan view, comparable to FIG. 1, showing details of the novel non-rotatable removable line-bearing member assembly forming part of the instant invention;

FIG. 8 is a view in side elevation, comparable to FIG. 2, showing further details of the assembly shown in FIG. 7;

FIG. 9 is a view in cross-section, partially fragmentary, of the arrangement for positively securing each of the line-bearing members to the hub of the casting reel, taken at line 9—9 of FIG. 8 and looking in the direction of the arrows; and, FIG. 10 is another view in cross-section of the assembly of FIGS. 7, 8 and 9, taken at line 10—10 of FIG. 7 and looking in the direction of the arrows.

For the purposes of promoting an understanding of the principles of the invention, reference will now be made to the embodiment illustrated in the drawings, and specific language will be used to describe the same. It will nevertheless be understood that no limitation of the scope of the invention is thereby intended, such alterations and further modifications in the illustrated device, and such further applications of the principles of the invention as illustrated therein, being contemplated as would normally occur to one skilled in the art to which the invention relates.

Referring now to FIGS. 1, 2, 3 and 4, a typical embodiment of the applicant's novel casting reel and handle structure is shown comprising a reel mounting bracket 11 having a base portion 11a mounting on and conforming in shape to a reel seat tube 55 (see FIG. 4) and an upwardly extending portion 11b through which a reel mounting spindle 14 extends and is positioned by a reel mounting nut 12. A reel hub 15 is mounted on the reel mounting spindle 14 in a manner to be discussed in detail herebelow.

With additional reference to FIGS. 7, 8, 9 and 10, the applicant's novel reel 10 comprises the reel hub 15, to which a circular clamp 16 is secured by conventional screw means 16a, for example. The circular clamp 16 has a plurality of straight sided cut-out portions therein which form, with one surface of the reel hub, rectangular, square, or other multi-sided openings adapted to receive the ends 17c of shank members 17 which extend radially therefrom. It should be understood that the aforesaid ends 17c of the shank members 17 are similar in cross-section to the openings defined by the reel hub 15 and the circular clamp 16, and are partially retained in position in such openings by the fit therebetween, with screw means 18 being provided with each to serve as locks therefor. Each of the ends of the shank members 17 also typically has a ridge or like upstanding portion 17b along a surface thereof which is adapted to fit into a correspondingly shaped portion 15b in the engaging surface of the reel hub 15 (see FIGS. 8 and 9). Such an arrangement provides further securing or locking of the individual shank members 17 with the reel hub 15. In other words, locking is achieved by the aforesaid screw means 18 and the complementary portions 15b and 17c on the reel hub 15 and the shank members 17, respectively.

As should be evident from the figures, each of the shank members 17 has a curved Y-type free-end portion 17a, which end-portion 17a is adapted to receive the line as it is wound around the consecutive shank members 17. Disposed proximate the free-end portion 17a of at least two of the shank members 17 is a handle 19 provided for readily turning the shank members 17 and, hence, the reel 10 during use. It should be noted that while the end 17c of each of the shank members 17 is square, rectangular, or multi-sided in cross-section, the remainder of such shank members 17 may assume other shapes in cross-section, the aforesaid multi-sided cross-section of each end 17c serving to positively align the respective shank members 17 and, thereby, prevent any twisitng of the line.

It should be apparent from the drawings that in the preferred form of the invention, the reel 10 is disposed at a slight angle with reference to the longitudinal axis of the rod, which may be approximately 2 degrees or 3 degrees, for example, thereby permitting a more or less straight flow of the fishing line from the reel 10 through the guides on the rod and thus reducing friction or drag on the line and improving casting accuracy.

Referring now particularly to FIG. 4, the applicant has provided a novel bearing tension adjustment arrangement disposed within the rotatable reel hub 15 of the reel 10. The reel hub 15 is provided with a hollow central portion having a shoulder 15a positioned substantially near the middle thereof. A bearing tension adjustment screw 20 extends inside of the reel mounting spindle 14, with head end 20a thereof being disposed within the circular clamp 16, and the opposite threaded end 20b extending outside of the reel mounting spindle 14. The reel mounting spindle 14 threads onto the threaded end 20b of the bearing tension adjustment screw 20 which is also adapted to receive a reel tension locking nut 21.

Also disposed within the reel hub 15 over the reel mounting spindle 14 are male bearings 25 and 26 having opposite upwardly sloping ends 25a and 26a, respectively, with the male bearing 25 being fixed in position between a shoulder 14a centrally disposed on the mounting spindle 14 and the upwardly extending portion 11b of the mounting bracket 11 when assembled. The male bearing 26 is axially movable with the movement of the bearing tension adjustment screw 20, with the head end 20a of the latter having projections 20c extending therefrom into the end wall of the male bearing 26 to prevent the rotational dispalcement thereof.

Female bearings 28 and 29, which rotate on and conform in shape to the male bearings 25 and 26, respectively, are press fitted into the hollow portion of the reel hub 15 adjacent each side of the shoulder 15a so that the reel hub 15 and the female bearings 28 and 29 rotate as a unit. The assembly is completed by a small outwardly curved disc or metal plate 30 which serves as a dust seal and which is retained in position by a retainer ring 31 which fits into a groove formed in the end of the reel hub 15.

When the bearing tension adjustment is tightened, the reel tension adjustment screw 20 is turned, as by the use of a conventional socket wrench, which moves male bearing 26 axially toward the male bearing 25. Female bearing 29 thereby engages the sloping end 26a of the male bearing 26, as does female bearing 28 with the sloping end 25a of the male bearing 25, increasing the amount of drag of the rotation of the reel hub 15 and hence the reel 10. It should be noted that FIG. 4 depicts the relationship of the components at the point of maximum drag or fraction. It should be further understood that when the reel tension adjustment is loosened, the converse of the above is true and the reel hub 15, and, hence, the reel 10, may then turn more freely, as desired, since the reel hub 15 and the female bearings 28 and 29 may then freely move between the sloping ends 25a and 26a of the male bearings 25 and 26, respectively, depending upon the particular adjustment, i.e. the distance the male bearing 26 has been moved away from the male bearing 25. It should further be apparent that the desired adjustment is maintained by use of the reel tension locking nut 21.

Considering now particularly FIG. 1 and FIG. 3, the applicant has provided a braking mechanism comprising brake shoes 40 and 41 pivotally mounted at one end thereof on a support member 42 positioned on the upwardly extending portion 11b of the reel mounting bracket 11. As should be apparent from FIG. 3, the brake shoes 40 and 41 encircle the reel hub 15, and the free ends thereof engage a control member 44 which is also positioned on the upwardly extending portion 11b of the reel mounting bracket 11 through linkages 46 and 47, respectively. The control member 44, which is rotatably mounted, has a fixed arm 44a extending therefrom which connects to a lever or brake rod 43 having a thumb button 43a at one end thereof. The lever or brake rod 43 is positioned on the handle grip tube of the handle assembly by means of a mounting bracket 66, and extending between the mounting bracket 66 and the thumb button 43a is a spring 48 which, through its action, serves to retain the reel hub 15 in a normally freely rotatable condition.

When the brake assembly is used, the operation pushes the thumb button 43a on the brake rod 43 with his hand, causing the control member 44 to rotate, through the fixed arm 44a thereof, in a counterclockwise direction in FIG. 3. The rotation of control member 44 moves the linkages 46 and 47 and, hence, forces the brake shoes 40 and 41, respectively, into direct contact with the reel hub 15, which contact, of course, effects the desired braking action. It should be apparent, of course, that the desired degree of braking action is dependent upon the amount of force exerted on the mechanism through the brake rod 43.

Considering now particularly FIGS. 1, 2 and 5, the applicant's novel handle structure incudes a hollow handle grip tube 50 having an integrally formed flanged end 50a. A cork grip 51 extends over the handle grip tube 50 and is maintained in position thereon by a threaded cap screw 52. The handle grip tube 50 has an inner taper at one end thereof which is adapted to receive a handle grip connecting tube 54 having a correspondingly tapered end and which may be of any desired length. The other end of the handle grip connecting tube 54 is also tapered and is adapted to be received in a reel seat tube 55 on which the reel mounting bracket 11 is retained.

The reel seat tube 55 has an upwardly extending flange 55a integrally formed at one end thereof and a reel seat clamping ring 56 is positioned thereadjacent. The base portion 11a of the reel mounting bracket 11 is adapted to fit into a cut-out tapered portion provided in the reel seat clamping ring 56 and between the reel seat tube 55. Another reel seat clamping ring 57 is adapted to slip over the opposite end of the base portion 11a of the reel mounting bracket 11 in a similar manner and a reel seat clamping nut 58 is then assembled on the end of the reel seat tube 55 adjacent the clamping ring 57. The latter end portion of the reel seat tube 55 is threaded to provide an effective lock arrangement with the reel seat clamping nut 58 for the reel mounting bracket 11. A rod connecting tube 59, which also has a tapered end portion, is adapted to be received within the other end of the reel seat tube 55, and, as the name implies, the remaining sections of the fishing rod connect thereto.

The assembly may be completed by the use of a typical butt guide 65, suitably positioned on the rod connecting tube 59, through which the line flows from the reel 10 down along the rod. It should be understood that the customizing of the balance of the applicant's novel handle assembly is readily accomplished by substituting various dimensioned, yet similar elements, for the preceding, with excellent results.

Referring now to FIG. 6, wherein like reference numerals are applied to parts similar to those in the other figures, an embodiment is disclosed therein which is distinguishable from the structure of FIG. 5 in that instead of using a straight handle grip connecting tube 54, and a straight rod connecting tube 59, these parts are offset in shape, as 70 and 71, respectively, so that the reel 10, when in assembled position, permits the flow of line through the butt guide 65 more closely along the rod. The embodiment of FIG. 6 is a specialized form which some fishermen may find advantageous to their particular needs insofar as balance and casting is concerned.

It should be apparent from the preceding that the applicant has provided a novel casting reel and handle structure which includes means for automatically and positively controlling the alignment of the line carrying members, one with respect to the other, and for customizing and controlling the rotation, and braking, of the reel through a novel tensioning device and structure and an effective braking mechanism. The invention provides for ease in use in that the braking and the reel rotation are readily effected by the different hands of the user. In addition, optimum handle balance is achieved for any particular user by the substitution of various sized components in the same general relationship and, as the invention is made from a lightweight material, such as aluminum, for example, the complete structure is simple to use for accurate casting.

Thus, as indicated herein, the applicant's novel casting reel and handle structure is susceptible to various changes within the spirit of the invention, and the above description should be considered as illustrative and not as limiting the scope of the following claim.

I claim:

A rotatable casting reel for a fishing rod comprising removable line-bearing members, a hub, a clamp having spaced apart multi-sided openings therein cooperating with a surface of said hub to receive the end of each of said removable line-bearing members, said removable line-bearing members being positioned radially with respect to the axis of said hub, means retaining said hub and said clamp in assembled relationship, at least one surface of said multi-sided opening and at least one surface of said end of said removable line-bearing member having complementary locking portions, and individual means laterally extending into said hub to secure said end of each of said removable line-bearing member within said multi-sided openings, said end of said removable line-bearing member having a shape in cross-section corresponding to said multi-sided opening.

References Cited by the Examiner

UNITED STATES PATENTS

| | | | |
|---|---|---|---|
| 336,888 | 3/1886 | Brooks | 242—115 |
| 473,985 | 5/1892 | White | 301—104 |
| 728,717 | 5/1903 | Hunter | 242—84.44 |
| 1,206,887 | 12/1916 | Murray | 301—104 |
| 1,351,549 | 8/1920 | Benson | 242—84.5 |
| 1,385,457 | 7/1921 | Kiest | 242—84.5 |
| 1,513,893 | 11/1924 | Coleman | 242—84.5 |
| 1,898,451 | 2/1933 | Kelly | 242—84.1 |
| 2,104,495 | 1/1938 | O'Brien | 43—22 |
| 2,231,340 | 2/1941 | Lee | 242—84.1 |
| 2,429,637 | 10/1947 | McCreary | 242—84.5 |
| 2,485,412 | 10/1949 | Renner | 242—115 X |
| 2,502,814 | 4/1950 | Bater | 242—84.53 |
| 2,546,776 | 3/1951 | Peterson | 242—84.53 |
| 2,578,477 | 12/1951 | Hurd | 242—84.1 |
| 2,587,257 | 2/1952 | Weisblatt | 242—84.5 |
| 2,630,647 | 3/1953 | Phillipson | 43—22 |

FOREIGN PATENTS

| | | |
|---|---|---|
| 10,527 | 1908 | Great Britain. |
| 28,413 | 1896 | Great Britain. |
| 621,076 | 4/1949 | Great Britain. |

FRANK J. COHEN, *Primary Examiner.*

J. STRIZAK, *Examiner.*

B. S. TAYLOR, *Assistant Examiner.*